July 28, 1953

B. D. H. TELLEGEN 2,647,239

PASSIVE FOUR TERMINAL NETWORK FOR GYRATING
A CURRENT INTO A VOLTAGE

Filed March 6, 1948

INVENTOR
BERNARDUS D. H. TELLEGEN

BY

AGENT

Patented July 28, 1953

2,647,239

UNITED STATES PATENT OFFICE 2,647,239

PASSIVE FOUR TERMINAL NETWORK FOR GYRATING A CURRENT INTO A VOLTAGE

Bernardus Dominicus Hubertus Tellegen, Eindhoven, Netherlands, assignor to Hartford National Bank and Trust Company, Hartford, Conn., as trustee Application March 6, 1948, Serial No. 13,506
In the Netherlands April 29, 1947

4 Claims. (Cl. 333—24)

For the impedance elements connected between the terminals of a passive electrical quadripole or four terminal network use has hitherto been limited to inductances (L), resistances (R), capacities (C) and ideal transformers as the basic circuit elements. The first three elements are dipoles, the relation between the instantaneous values of the current $i$ passing through and the voltage $v$ set up across the elements being given by $$v = L\frac{di}{dt}, v = iR \text{ and } v = \int \frac{i}{C} dt$$

respectively. An ideal transformer is a quadripole, in which between the instantaneous values of the primary and secondary voltages $v_1$ and $v_2$ and currents $i_1$ and $i_2$ exist the relations:

$$i_1 = n i_2$$
$$v_2 = n v_1$$

(1)

wherein the coefficient $n$ is the transformation ratio if the positive voltages and currents correspond to those indicated with the quadripole according to Fig. 1 as described more fully hereinafter.

The properties of quadripoles built up from such network elements may be summarised as follows:

a. The relations between the currents passing through and the voltages set up across the primary and secondary terminals may be represented by linear differential equations.

b. The coefficients of these differential equations are constant; if the electrical oscillations are assumed to be sinusoidal and if for the voltage and the current at the primary and secondary terminals of the quadripole the complex magnitudes $V_1$, $I_1$ and $V_2$, $I_2$ respectively are introduced, we find as solution of the differential equations between these magnitudes the relations:

$$V_1 = Z_{11}I_1 + Z_{12}I_2$$
$$V_2 = Z_{21}I_1 + Z_{22}I_2$$

(2)

the four pole parameters, $Z_{11}$, $Z_{12}$, $Z_{21}$ and $Z_{22}$ being functions of frequency.

c. The quadripole cannot supply energy.

d. Between the coefficients of the above quadripole equations there exists the so-called reciprocity relation:

$$Z_{12} = Z_{21}$$

(3)

The invention has for its object to provide, in addition to the aforesaid network elements, a fifth network element the properties of which conform to the properties of the other elements, save that the property of reciprocity mentioned in the above under $d$ is absent. The fifth circuit element has the property of gyrating a current into a voltage and vice versa. In the ideal case for this fifth element the following relations exist between the instantaneous values of the voltage set up across and the current passing through the primary and secondary terminals:

$$v_1 = -s i_2$$
$$v_2 = s i_1$$

(4)

respective if the positive directions are again assumed to be in accordance with the quadripole shown in Fig. 1, the coefficient $s$ having the dimension of a resistance.

A network element to which these equations 4 apply, will be referred to hereinafter as "ideal gyrator." An ideal gyrator consequently exhibits in contrast to the relation (3), the property that the "anti-reciprocity"

$$Z_{12} = -Z_{21}$$

(5)

applies.

In addition to the properties mentioned above under $a$, $b$ and $c$, of which the latter may be represented by the equation, $$i_1 v_1 + i_2 v_2 = 0$$

(6)

which equation is also valid for the ideal transformer, an ideal gyrator furthermore has, for example, the following properties based on anti-reciprocity: a secondary short-circuit of an ideal gyrator occurs at the primary terminals as an infinitely high impedance; a secondary capacitative reactance will occur at the primary as an inductive reactance, two cascade-connected gyrators have the property of a transformer.

So-called impedance-transforming networks are known, in which for a definite frequency the relations $$V_1 = jXI_2$$
$$V_2 = jXI_1$$

are satisfied. Here the proportionality factor $jX$ has the same sign, in contradistinction to the relations (4), in which the proportionality factor (5) is of opposite sign. Such networks consequently satisfy the reciprocity relation (3) and are therefore unsuitable for the purpose according to the invention.

A more extended treatment of the theoretical principles underlying the invention may be found in the article entitled "The Gyrator, A New Electric Network Element" published in the "Philips Research Reports," volume 3, pages 88 to 101, April 1948. Reference is now made to the following detailed description of the invention to be read in connection with the accompanying drawing wherein:

Fig. 5 is a band-pass filter employing a gyrator element in accordance with the invention.

Figure 1:
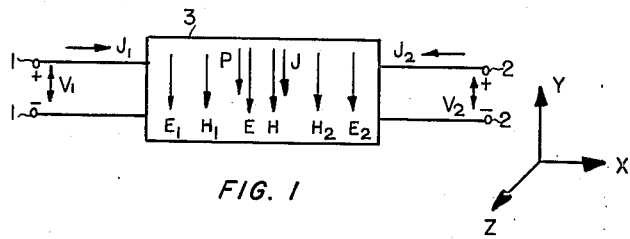
Fig. 1 is a schematic diagram illustrating the theory underlying the invention.

The manner in which a gyrator according to the invention may be realized is explained with reference to Fig. 1. Let us assume that the voltage $V_1$ and the current $I_1$ at the primary terminals 1—1 of the quadripole shown in Fig. 1 produce an electric field having a field strength $E_1$ and a magnetic field having a field strength $H_1$ whereas the voltage $V_2$ and the current $I_2$ at the secondary terminals 2—2 of the quadripole produce an electric field having a field strength $E_2$ and a magnetic field having a field strength $H_2$ (for convenience all these vectors are shown in the figure parallel to one another, but, in general, they have an arbitrary direction with respect to one another). The resultant of the two fields is operative in a medium 3. The resultant of the electric fields has a value equal to E and that of the magnetic fields has a value H. Owing to the electric field of field strength E and the magnetic field of field strength H an electrical polarisation P and a magnetic polarisation J are produced in the medium 3. If these fields E and H and the corresponding polarisations P and J are resolved according to three mutually perpendicular axes $x$, $y$ and $z$ the components P and J may be supposed phenomenologically to vary linearly with the components E and H. For a medium causing no losses we then arrive at equations of the following form $$P_x = \kappa_{xx} E_x + (\kappa_{xy} + j\lambda_{xy}) E_y + (\kappa_{zx} + j\lambda_{zx}) E_z + (\gamma_{xx} + j\delta_{xx}) H_x + (\gamma_{xy} + j\delta_{xy}) H_y + (\gamma_{xz} + j\delta_{xz}) H_z$$

$$P_y = (\kappa_{xy} - j\lambda_{xy}) E_x + \kappa_{yy} E_y + (\kappa_{yz} + j\lambda_{yz}) E_z + (\gamma_{yx} + j\delta_{yx}) H_x + (\gamma_{yy} + j\delta_{yy}) H_y + (\gamma_{yz} + j\delta_{yz}) H_z$$

$$P_z = (\kappa_{zx} - j\lambda_{zx}) E_x + (\kappa_{yz} - j\lambda_{yz}) E_y + \kappa_{zz} E_z + (\gamma_{zx} + j\delta_{zx}) H_x + (\gamma_{zy} + j\delta_{zy}) H_y + (\gamma_{zz} + j\delta_{zz}) H_z$$

$$J_x = (\gamma_{xx} - j\delta_{xx}) E_x + (\gamma_{yx} - j\delta_{yx}) E_y + (\gamma_{zx} - j\delta_{zx}) E_z + \chi_{xx} H_x + (\chi_{xy} + j\zeta_{xy}) H_y + (\chi_{zx} + j\zeta_{zx}) H_z$$

$$J_y = (\gamma_{xy} - j\delta_{xy}) E_x + (\gamma_{yy} - j\delta_{yy}) E_y + (\gamma_{zy} - j\delta_{zy}) E_z + (\chi_{xy} - j\zeta_{xy}) H_x + \chi_{yy} H_y + (\chi_{yz} + j\zeta_{yz}) H_z$$

$$J_z = (\gamma_{xz} - j\delta_{xz}) E_x + (\gamma_{yz} - j\delta_{yz}) E_y + (\gamma_{zz} - j\delta_{zz}) E_z + (\chi_{zx} - j\zeta_{zx}) H_x + (\chi_{yz} - j\zeta_{yz}) H_y + \chi_{zz} H_z$$

(7)

The coefficients in the principal diagonal are real; the coefficients lying symmetrically with respect to this diagonal are conjugate complex.

The coefficients consist of six groups of quantities, denoted by $\kappa$, $\lambda$, $\gamma$, $\delta$, $\chi$, $\zeta$, representing six different properties of the medium. If the terminal pairs of a four-pole are coupled to each other by means of one of these properties of the medium constituting the four-pole, this four-pole will be of a certain type.

In the first place this four-pole will or will not satisfy the reciprocity relation. To investigate this we differentiate the Equations (7) with respect to $t$. The left-hand sides will then become $dP_x/dt$, etc. and $dJ_x/dt$, etc., and the right-hand sides we may multiply by $j\omega$. Now $dP/dt$ is a part of a current, $dJ/dt$ is a part of a voltage, E is a part of a voltage, and H is a part of a current. So, bearing in mind what has been said with reference to Equations (3) and (5) about the way the reciprocity relation is expressed by equality or opposite equality of certain four-pole coefficients, we see that those four-poles of which the terminal pairs are coupled to each other by means of the property of the medium represented by $\kappa$, $\delta$, or $\chi$, respectively by $\lambda$, $\gamma$, or $\zeta$, will respectively will not satisfy the reciprocity relation of networks.

Furthermore, P and E are related to electric pairs of terminals and J and H to magnetic pairs. Therefore, if a transformer or a gyrator could be realized by coupling two terminal pairs by means of one of the above-mentioned six properties of a medium, coupling by $\kappa$ could lead only to a double-electric transformer,
$\lambda$ could lead only to a double-electric gyrator,
$\gamma$ could lead only to an electromagnetic gyrator,
$\delta$ could lead only to an electromagnetic transformer,
$\chi$ could lead only to a double-magnetic transformer,
$\zeta$ could lead only to a double-magnetic gyrator.

The coefficients $\kappa$ and $\zeta$ refer to the susceptibility of the material of the medium 3.

According to the invention, use is made of a medium such or, if desired, of a medium brought into a state such that it exhibits the property that at least one of the coefficients $\gamma$, $\lambda$, or $\zeta$ is unequal to zero, for if this is the case, it will be possible, by a coupling as indicated above between a primary and a secondary electric or magnetic field, to build up a gyrator which is ideal or nearly ideal.

Some examples of media will be discussed with reference to Figs. 2 and 3; one of the said coefficients being here unequal to zero. Fig. 4 shows a practical example of a gyrator according to the invention.

Figure 2:
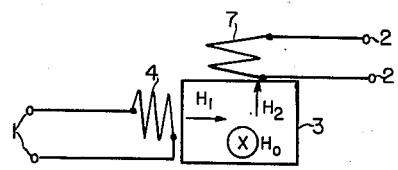
Fig. 2 is a first preferred embodiment of a gyrator element in accordance with the invention.

Fig. 2 represents a gyrator according to the invention in which for the medium use is made of a substance for which the coefficient $\zeta$ is unequal to zero. Such a substance may be obtained by using, for example, magnetic material adapted to be brought into the state of saturation by a constant magnetic field of low field strength $H_0$. The primary terminals 1 have connected to them a winding 4, a primary magnetic field of field strength $H_1$ being produced by the current passing through this winding 4. Owing to the gyromagnetic effect the combination of this alternating field $H_1$ and the field $H_0$ produces, at right angles to these two fields, a magnetic alternating field $H_2$ which induces in the winding connected to the secondary terminals 2 a voltage which is proportional to the current supplied to the primary terminals 1. In order to guarantee an optimum ideal gyrator effect, it is desirable that the mutual induction between the coils 4 and 7 should be minimum.

Figure 3A:
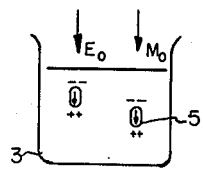
Fig. 3 is a schematic diagram illustrating the method of producing a medium for a gyrator.
Figure 3B:
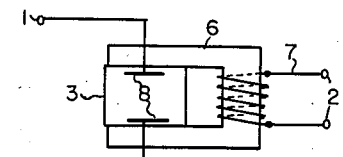
Figure 4:
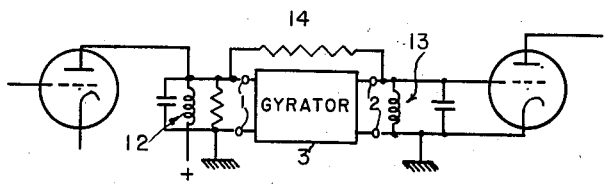
Fig. 4 is a second preferred embodiment of a gyrator element in accordance with the invention.

Fig. 3a illustrates, by way of example, a method of manufacturing a medium 3 for which the coefficient $\gamma$ is unequal to zero. For this purpose a suspension of magnetic material is made in a carrier liquid in which, moreover, an oversaturated solution of a material having a high electrical dipole moment is formed. This liquid is subjected to the action of a strong electric and magnetic field, the field strengths of which are parallel to one another and are directed in the same or in opposite sense. A thin film of electric dipole material will now be formed around the magnetic dipoles 5 the magnetic and electric polarities having the same or opposite sense. If a medium 3, built up from such a magnetic material wherein the elementary magnets have at the same time a great magnetic dipole moment and, parallel thereto, a permanent electric dipole moment, is brought between the poles of a magnetic circuit 6, a magnetic flux will be produced in the circuit 6, if a current is supplied to the electrodes 8 connected to the primary terminals 1, owing to which the winding 7 connected to the terminals 2 has induced in it a voltage which is proportional to the current supplied to the primary terminals 1.

A circuit-arrangement in which the medium has a coefficient $\lambda$ which is unequal to zero, may be constructed, for example, in a manner similar to that shown in Fig. 2, the coils 4 and 7 being replaced by condenser plates.

The invention is not considered to be restricted to gyrators comprising media of which only one of the coefficients $\gamma$, $\lambda$ or $\zeta$ is unequal to zero; it is possible that at the same time more than one of these coefficients is unequal to zero. Moreover, some of the coefficients $\kappa$ $\chi$ or $\delta$ will, in general be unequal to zero.

A general property of a quadripole built up with a gyrator is that $Z_{12}$ is unequal to $Z_{21}$.

Fig. 4 shows one example of application of a gyrator according to the invention. The primary terminals 1 of the gyrator 3 are connected to an oscillatory circuit 12 tuned to the central frequency of electrical oscillations to be transmitted, whereas the secondary terminals 2 are connected to a similar oscillatory circuit 13. The lower terminal 1 and the lower terminal 2 are connected to a point of constant potential, and the upper terminals 1 and 2 are interconnected for direct-current through a coupling impedance 14. It has now been found to be possible to dimension the direct-current coupling impedance 14 and the gyrator coupling 3 in such manner with respect to one another that the circuit behaves like a bandpass filter. If in this case the gyrator coupling has the correct sign with respetc to the direct-current coupling, so that the two couplings support one another, it has been found that with a similar bandwidth and with similar input and output impedances as with a conventional bandpass filter comprising inductively or capacitatively coupled circuits, the transmission ratio is, with critical coupling, a factor $1+\sqrt{2}$ as great.

If the quadripole shown in Fig. 2 is used as a gyrator, use may be made in a suitable manner of the coils 4 and 7 for the inductances included in the circuits 12 and 13.

What I claim is:

1. A passive network comprising a polarized medium, input means to supply an alternating voltage $V_1$ to said medium to produce an alternating current flow $I_1$ in said input means, output means coupled to said medium to obtain an alternating voltage $V_2$ producing a current flow $I_2$ in said output means, said medium possessing gyromagnetic characteristics and including material having an anisotropic polarization property wherein:

$$V_1 = -SI_2$$
$$V_2 = SI_1$$

where S is a constant.

2. A passive four-terminal network comprising a polarizable medium possessing gyromagnetic properties, input terminals to apply an input voltage and an input current to said network, output terminals to take an output voltage and an output current from said network, means to polarize said medium in a first direction, means connected to said input terminals to produce a primary field in said medium in a second direction different from said first direction, said primary field producing in said polarized medium a secondary field having a third direction different from said first and second directions, and means coupled to said secondary field to produce said output voltage and output current at said output terminals.

3. A circuit arrangement having a passive four-terminal network comprising a polarizable medium possessing gyromagnetic properties, input terminals to apply an input voltage and an input current to said network, output terminals to take an output voltage and an output current from said network, means to polarize said medium in a first direction, means connected to said input terminals to produce a primary field in said medium in a second direction different from said first direction, said primary field producing in said polarized medium a secondary field having a third direction different from said first and second directions, and means coupled to said secondary field to produce said output voltage and output current at said output terminals, the relation between said input voltage $V_1$, said input current $I_1$, said output voltage $V_2$ and said output current $I_2$ being $$V_1 = Z_{11}I_1 + Z_{12}I_2$$
$$V_2 = Z_{21}I_1 + Z_{22}I_2$$

wherein $Z_{11}$ is the input impedance of the network, $Z_{22}$ is the output impedance of the network and $Z_{21}$ and $Z_{12}$ are transfer impedances having unequal magnitude.

4. A passive four terminal network comprising a polarized medium possessing gyromagnetic properties, said medium being polarized in a first direction, input terminals to apply an input voltage and an input current to said network, output terminals to take an output voltage and an output current from said network, means connected to said input terminals to produce a primary field in said medium in a second direction different from said first direction, said primary field producing in said polarized medium a secondary field having a third direction different from said first and second directions, and means coupled to said secondary field to produce said output voltage and output current at said output terminals.

BERNARDUS DOMINICUS
HUBERTUS TELLEGEN.

References Cited in the file of this patent

UNITED STATES PATENTS

| Number | Name | Date |
|---|---|---|
| 1,822,129 | Craig | Sept. 8, 1931 |
| 1,948,209 | Fichandler | Feb. 20, 1934 |

(Other references on following page)

UNITED STATES PATENTS

| Number | Name | Date |
|---|---|---|
| 2,379,168 | McClellan | June 26, 1945 |
| 2,383,475 | Dodington | Aug. 28, 1945 |
| 2,464,807 | Hansen | Mar. 22, 1949 |

OTHER REFERENCES

Publication I. Hall, E. H., "On the New Action of Magnetism on a Permanent Electric Current," Philosophical Magazine and Journal of Science, November 1880, pages 301 through 328 (pages 301–304, 318 relied upon), published in London. (Copy in Scientific Library.)

Publication II. Campbell, L. L., "Galvanometer and Thermomagnetic Effects," 1923, pages 35, 70–74, published in New York. (Copy in Scientific Library.)

Holstein et al., Physical Review, vol. 58, December 15, 1940, pp. 1098–1113. (Copy in Scientific Library.)

Griffiths, Nature, vol. 158, November 9, 1946, pp. 670–671. (Copy in Scientific Library.)

Kittel, Physical Review, vol. 71, February 15, 1947, pp. 270–271. (Copy in Scientific Library.)

Snoek, Nature, vol. 160, July 19, 1947, p. 90. (Copy in Scientific Library.)